(12) United States Patent
Brega et al.

(10) Patent No.: US 7,880,643 B2
(45) Date of Patent: Feb. 1, 2011

(54) METHOD AND DEVICE FOR FOLLOWING OBJECTS, PARTICULARLY FOR TRAFFIC MONITORING

(75) Inventors: Roberto Brega, Zurich (CH); Felix H. Wullschleger, Zurich (CH)

(73) Assignee: Logobject AG, Zurich (CH)

( * ) Notice: Subject to any disclaimer, the term of this patent is extended or adjusted under 35 U.S.C. 154(b) by 1352 days.

(21) Appl. No.: 10/499,202

(22) PCT Filed: Dec. 19, 2002

(86) PCT No.: PCT/CH02/00713

§ 371 (c)(1),
(2), (4) Date: Nov. 30, 2004

(87) PCT Pub. No.: WO03/052715

PCT Pub. Date: Jun. 26, 2003

(65) Prior Publication Data

US 2005/0068198 A1    Mar. 31, 2005

(30) Foreign Application Priority Data

Dec. 19, 2001  (CH) .................................. 2326/01

(51) Int. Cl.
*G08G 1/01*        (2006.01)
(52) U.S. Cl. .................. 340/933; 340/942; 340/935; 340/936; 340/941; 701/117
(58) Field of Classification Search .............. 340/933, 340/942, 935, 936, 941; 701/117
See application file for complete search history.

(56) References Cited

U.S. PATENT DOCUMENTS 3,105,953 A * 10/1963 Polster ........................ 340/935

(Continued)

FOREIGN PATENT DOCUMENTS

EP           0 454 166 A2   10/1991

(Continued)

OTHER PUBLICATIONS

Taxomex, "Marksman", http://www.taxomex.ch/marksman_d.html, Zurich, Schweiz.

(Continued)

*Primary Examiner*—Thomas G Black
*Assistant Examiner*—Wae Louie
(74) *Attorney, Agent, or Firm*—Buchanan Ingersoll & Rooney PC

(57) ABSTRACT

A method for tracking objects, especially for monitoring traffic, wherein a sensor measuring in an essentially horizontal and radial manner detects metrical data on moving objects in the form of raw data and transmits said data to a computer unit. The raw data is processed in the computer in such a way that the objects are tracked and the geometric properties thereof are determined. The static background is autonomously recognized and adapted or updated if changes occur. Objects in a present scene are tracked and current parameters are determined and correlated with the parameters of the objects of previous scenes. The method is particularly suitable for the detection and recognition of non-static traffic infractions which can only be recognized by analyzing the tracking of an object. The invention can be used in conjunction with several sensors in existing traffic control systems. Also disclosed is a device for carrying out the above-mentioned method.

22 Claims, 3 Drawing Sheets

U.S. PATENT DOCUMENTS

| | | | | |
|---|---|---|---|---|
| 4,772,875 | A | * | 9/1988 | Maddox et al. ............ 340/522 |
| 5,231,393 | A | * | 7/1993 | Strickland .................. 340/936 |
| 5,299,971 | A | * | 4/1994 | Hart .......................... 446/484 |
| 5,434,927 | A | * | 7/1995 | Brady et al. ................ 382/104 |
| 5,473,368 | A | * | 12/1995 | Hart .......................... 348/155 |
| 5,546,188 | A | * | 8/1996 | Wangler et al. ............ 356/5.01 |
| 5,555,036 | A | * | 9/1996 | Harnett et al. ............. 340/933 |
| 5,668,739 | A | * | 9/1997 | League et al. .............. 382/103 |
| 5,752,215 | A | * | 5/1998 | Zaaiman et al. ............ 701/117 |
| 5,757,472 | A | * | 5/1998 | Wangler et al. ............ 356/4.01 |
| 5,761,326 | A | * | 6/1998 | Brady et al. ................ 382/103 |
| 5,774,569 | A | * | 6/1998 | Waldenmaier ............. 382/100 |
| 5,793,491 | A | * | 8/1998 | Wangler et al. ............ 356/613 |
| 5,821,879 | A | * | 10/1998 | Liepmann ................... 340/942 |
| 5,896,190 | A | * | 4/1999 | Wangler et al. ............ 356/4.01 |
| 6,021,364 | A | * | 2/2000 | Berliner et al. ................ 701/1 |
| 6,317,058 | B1 | | 11/2001 | Lemelson et al. .......... 340/910 |
| 6,417,784 | B1 | * | 7/2002 | Hilliard et al. .............. 340/941 |
| 6,556,916 | B2 | * | 4/2003 | Waite et al. ................. 701/117 |
| 6,647,361 | B1 | * | 11/2003 | Laird et al. ..................... 703/8 |
| 6,750,787 | B2 | * | 6/2004 | Hutchinson ................ 340/942 |
| 6,970,102 | B2 | * | 11/2005 | Ciolli ......................... 340/933 |
| 7,274,438 | B2 | * | 9/2007 | Doemens et al. ........... 356/5.04 |
| 2003/0042303 | A1 | * | 3/2003 | Tsikos et al. ................ 235/384 |
| 2003/0042304 | A1 | * | 3/2003 | Knowles et al. ............ 235/384 |
| 2003/0052175 | A1 | * | 3/2003 | Tsikos et al. ........... 235/472.01 |
| 2003/0060969 | A1 | * | 3/2003 | Waite et al. ................. 701/117 |
| 2003/0062414 | A1 | * | 4/2003 | Tsikos et al. ................ 235/454 |
| 2005/0068198 | A1 | * | 3/2005 | Brega et al. ................. 340/933 |

FOREIGN PATENT DOCUMENTS

| | | |
|---|---|---|
| EP | 0 741 377 A | 11/1996 |
| EP | 0 567 059 B1 | 12/1998 |
| JP | 10-63991 | 3/1999 |
| JP | 11-167694 | 6/1999 |
| WO | 97/50067 A | 12/1997 |
| WO | WO 03/019234 | 3/2003 |

OTHER PUBLICATIONS

Taxomex, "Speedy", http://www.taxomex.ch/speedy_d.html, Zurich, Schweiz.

Multanova, "Speed Monitoring Using Mutanova 6F Radar Technology", Multanova Road Safety Systems, Uster, Schweiz.

Multanova, "Safer Roads Through High-Tech Enforcement", Multanova Road Safety Systems, Uster, Schweiz.

Jenoptik, "Lotos", http://www.jenoptik-los.de/lasersensor/deutsch/traffic_monitoring/lotos.html, Jenoptik Laser; Optik, Systeme, Jena, Deutschland.

Siemens, "Fast Detection of Traffic Conditions with Traffic Eye (R) Universal", Munchen, Deutschland.

Sick, TCS 200 Traffic Classification System for Detecting and Classifying Vehicles, Reute, Deutschland.

Michael P. Windham, "Cluster Validity for the Fuzzy c-Means Clustering Algorithm", IEEE Transactions on Pattern Analysis and Machine Intelligence, Jul. 1982, vol. 4, No. 4, pp. 357-363.

Yaakov Bar-Shalom et al., "Estimation with Applications to Tracking and Navigation", Techniques and Software, 1983, Artech House.

Donald B. Reid, "An Algorithm for Tracking Multiple Targets", IEEE, Transactions on Automatic Control, vol. 24, No. 6, Dec. 1979, pp. 843-854.

Mohinder S. Grewal et al., "Kalman Filtering Theory and Practice", Prentice Hall, 1983, pp. 1-26.

Choon et al., "Object recognition algorithm for adaptive cruise control of vehicles using laser scanning senor", *IEEE Intelligent Transportation Systems Conference Proceedings*, Dearborn, MI, Oct. 1-3, 2000, p. 305-310.

Ewald et al., "Laser, scanners for obstacle detection in automotive applications", Proceedings of the IEEE Intelligent Vehicles Symposium 2000, Dearborn, MI, Oct. 3-5, 2000, p. 682-687.

Fuerstenberg et al., "Object Tracking and Classification using Laserscanners-Pedestrian Recognition in Urban Environment", *ITSC 2001, IEEE 4th Int. Conf. on Intelligent Transport Systems*, pp. 1-4.

Dietmayer et al., "Model Based Object Classification and Object Tracking in Traffic Scenes from Range Images", *IEEE Symposium Intelligent Vehicles 2001, Proceedings of the IV2001*, May 3-6, 2001, Tokyo, Japan.

Dietmayer et al., "A System Architecture for the Detection and Modeling of Dynamic Traffic Scenes", *World Congress on Intelligent Transport Systems*, Proceedings of the ITS2001, Sep. 30-Oct. 4, 2001, Sydney, Australia.

Kirchner et al., "Integrated Obstacle and Road Tracking using a Laser Scanner", *Proceedings of the IEEE Intelligent Vehicles Symposium 2000*, Dearborn, MI, Oct. 3-5, 2000, pp. 675-681.

Cheok et al., "Moving cluster classification technique with lidar traffic monitoring application", Proceedings of the American Control Conference, Philadelphia, PA, Jun. 1998, pp. 944-949.

Fuerstenberg et al., "Multilayer Laserscanner for robust Object Tracking and Classification in Urban Traffic Scenes", *Proceedings of ITS 2002*, 9th World Congress on Intelligent Transport Systems, Oct. 2002, Chicago, IL, pp. 1-10.

Gilbert et al., "Measurement of Vehicle Trajectories Using 3-D Laser Radar", SPIE, Vol. 2344, Intelligent Vehicle Highway Systems, 1994, pp. 30-41.

Harville et al., "Foreground Segmentation Using Adaptive Mixture Models in Color and Depth", *Workshop of the IEEE Proceedings*, Detection and Recognition of Events in Video 2001, Jul. 8, 2001, Vancouver, BC, Canada, pp. 3-11.

Stauffer et al., "Adaptive background mixture models for real-time tracking", *Computer Vision and Pattern Recognition*, 1999 IEEE Computer Society Conference, Jun. 23-25, 1999, Fort Collins, CO, pp. 246-252.

Stauffer et al., "Learning Patterns of Activity Using Real-Time Tracking", *IEEE Transactions on Pattern Analysis and Machine Intelligence*, vol. 22, No. 8, Aug. 2000, pp. 747-757.

Ren et al., "Motion Detection with Non-stationary Background", *11th Int. Conf. on Image Analysis and Processing*, Sep. 26-28, 2001, Palermo, pp. 78-83.

McKenna et al., "Tracking Interacting People", *4th IEEE Int. Conf. on Automatic Face and Gesture Recognition*, Mar. 26-30, 2000, Grenoble, pp. 1-6.

Toyama et al., "Wallflower: Principles and Practice of Background Maintenance", *7th IEEE Int. Conf. on Computer Vision*, Sep. 20-27, 1999.

Seki et al., "A Robust Background Subtraction Method for Changing Background", *5th IEEE Workshop on Applications of Computer Vision*, Dec. 4-6, 2000, Palms Spring, CA, pp. 207-213.

* cited by examiner

METHOD AND DEVICE FOR FOLLOWING OBJECTS, PARTICULARLY FOR TRAFFIC MONITORING

The present invention relates to a method for following objects, particularly for traffic monitoring according to Claim 1 and a device for performing the method according to Claim 16.

The saturation of the traffic systems in the industrial countries and the simultaneous continuous growth of traffic require that this system be optimally used. For this, it is necessary to be able to measure the prevailing traffic as accurately as possible "in real time." The quality of a guidance system depends decisively on the quality and statement power of the data: the more features are encompassed, the more possibilities are given for modeling the process. The simplest feature is the presence of an object. Further features are, e.g., the size or speed of the object. The mentioned features belong to a class of features which can be determined by a suitable set of sensors. This set of sensors uses one or more physical laws for measurement, such as the measurement of speed by the Doppler effect.

Further, non-trivial features to be determined are the type of object, direction of the object, path of the object, collisions with other objects, distances between adjacent following objects, behavior of the objects, e.g. exceeding predefined regions.

The devices used at present are limited exclusively to the determination of simple features. Examples of these are:

Taxomex MARKSMAN—Determination of vehicle axes by means of pneumatics (http://www.taxomex.ch/marksman_d.html; Taxomex AG, CH-8037 Zurich, Switzerland).

Taxomex SPEEDY—Determination of vehicle speed (http://www.taxomex.ch/speedy_d.html; Taxomex AG, CH-8037 Zurich, Switzerland).

Multanova RADAR—Determination of vehicle speed by Doppler effect (Company brochure, Multanova AG, CH-8612 Uster, Switzerland).

Multanova MultaLaser-II—Determination of vehicle speed by laser technique (Company brochure, Multanova AG, CH-8612 Uster, Switzerland).

Jenoptik LOTOS—Determination of traffic flow and speed by laser technique (http://www.jenoptic-los.de/laser-sensor/deutsch/traffic_monitoring/lotos.html; JENOPTIK Laser, Optik Systeme GmbH, Jena, Germany).

Siemens TRAFFICEYE—Determination of traffic flow and speed by video camera (Company brochure, Siemens AG, D-81359 Munich, Germany).

SICK TCS 2000—Determination of traffic flow, speed and classification of objects by combined Doppler effect and laser technique (Product Information, Sick AG, D-79276 Reute, Germany).

The known systems have the disadvantage that they measure only one or a few features and in no case simultaneously discover the complex behavior of objects. Consequently, exact results can be obtained with these apparatuses only when complex calibration processes are performed, which, however, are not suitable for mobile use, The present invention has as its object a method for following objects, in particular for traffic monitoring.

A further object consists of a device for performing the method.

The object is attained by means of a method according to Claim 1 and by a device according to Claim 16. In this method, data are evaluated in real time, after they have been detected by one or more horizontal surface-coverage radially metric sensor(s) (e.g., laser range finder(s)).

The method and associated device are described hereinafter.

The method according to the invention is explained hereinafter on the basis of traffic monitoring; this represents only an exemplary application possibility of the detected data. The method set forth serves as a basis for a large number of further applications, which can be easily realized because of the quality and diversity of the extracted features.

The following concepts are defined in the present invention:

LIDAR (Light Detection and Ranging): A sensor principle based on a laser pulse which is emitted and whose reflection at an obstacle is measured with respect to intensity and time of flight. Distance is determined with this information. In addition, strongly reflecting objects (reflectors) can be unambiguously identified.

Raw data: The unprocessed data delivered from the sensor.

In the loop: Operating mode in which the same set of sensors are used both for the configuration and also for the actual operation.

Object: Living beings and vehicles which are stopped in the working region of the sensor.

Object data: A set of measurement points which were generated from the object.

Object representation: Computer representation of the object.

Scene: Description of all objects in the working region at a given instant.

Cluster: Accumulation of like entities or measurement points which are considered as belonging together.

Virtual induction loop: The effective information loop, consisting of induction changes in the presence of metallic objects, replicated virtual line, which reacts to the abovementioned objects.

Figure 1:
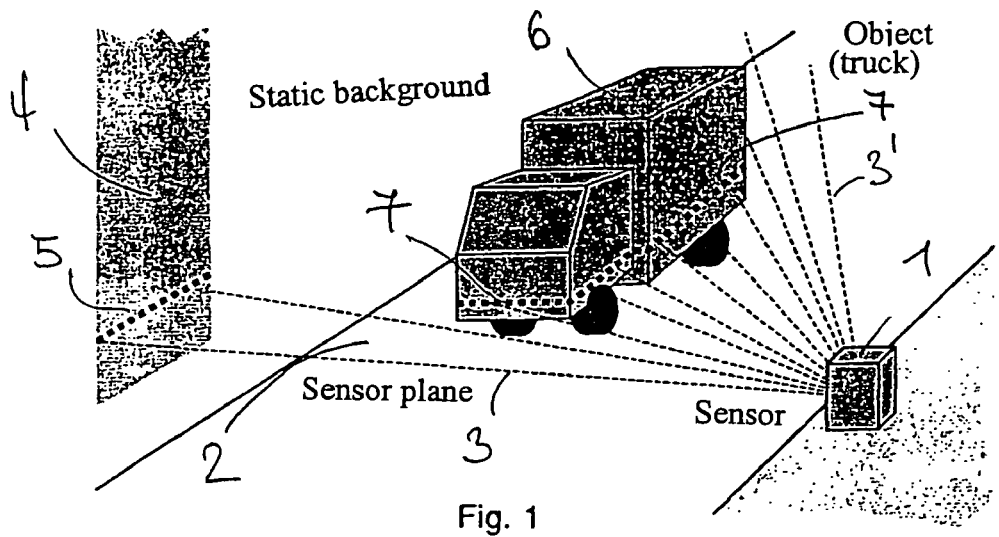
FIG. 1 shows a schematic diagram of the device arrangement

FIG. 1 shows a schematic diagram of the device arrangement according to the invention. A sensor 1 acting radially in a sensor plane 2 is installed at the edge of a street and has a fan-like working region, which is bounded by lines 3, 3' of the sensor. The working region is bounded on the opposite side of the street by buildings, garden walls, trees and the like, which in all form a static background 4. This static background 4 is metrically detected by the sensor by means of numerous measurement points 5. An object 6 freely movable on the street, e.g. a truck, is likewise metrically detected over numerous measurement points 7.

The prerequisites for the installation of the device are listed as follows:

It is supposed that the zone to be monitored is sufficiently flat. That is, a plane, or respectively the sensor plane, must pass through this zone, and the street pavement, measured vertically, is at a distance of at least 25 cm, but at most 75 cm, from it.

Figure 2:
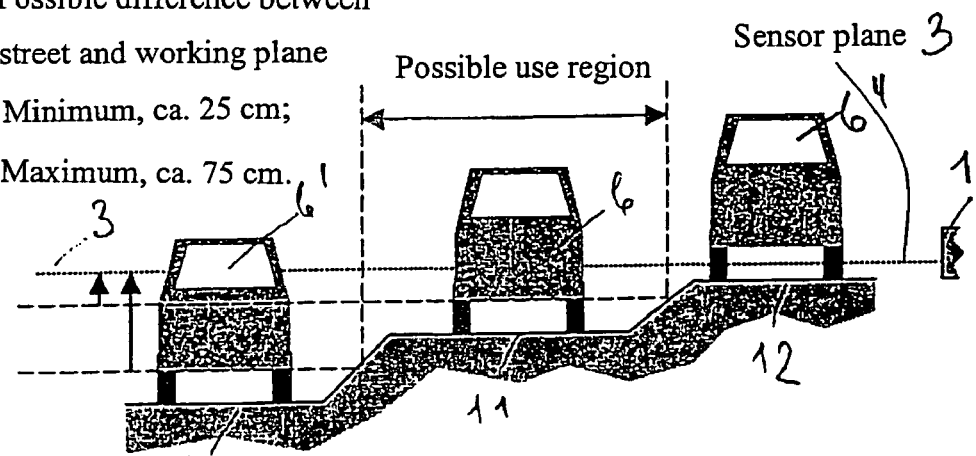
FIG. 2 shows prerequisites for the sensor plane

FIG. 2 illustrates the prerequisites for the sensor plane or working plane. Vehicles 6, 6', 6" are located on the street with three roadways 10, 11, 12 offset in height. The sensor 1 with sensor plane 3 installed at the street edge is visible. This meets the vehicle 6" at the height of the wheel hub and vehicle 6' at window height. The sensor plane 3 is unfavorable for both vehicles 6', 6", which are outside the possible region of use. For vehicle 6, the sensor plane lies within the possible region of use.

Furthermore, the prerequisite is set that the sensor plane is wholly visible from the sensor 3. If the object to be followed is covered for a short time by its own movement or the movements of other objects, then this does not result in impairment of the method, but shows a "graceful degradation" of the method. That is, the increasingly frequent covering of objects has only a decreasing data quality as a result.

Method.

The use of the device according to the invention can be divided into three basic functions: firstly configuration, secondly operation, and thirdly data exchange.

1. Configuration

Configuration follows after the mechanical installation, which can vary greatly according to the application. The configuration acts to define the working region, or the working range, of the device and also to configure or parameterize the use-specific applications. Use-specific applications are, e.g., the counting of objects, the inspection of the behavior of objects, etc.

Topological parameters are given by unambiguously detectable markings which can be simply and intuitively set.

Figure 3:
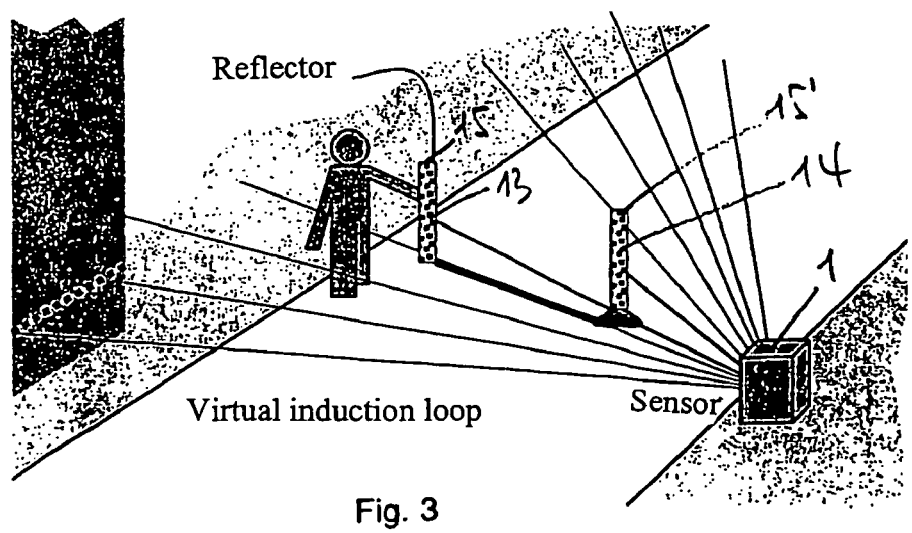
FIG. 3 shows an 'in the loop' configuration

FIG. 3 shows an "in the loop" configuration. For example, a so-called "virtual loop" is given by setting two markers 13, 14, defining a left and a right border. The two markers 13, 14 can be brought about by a laser-based sensor system 1 with optical reflectors 15, 15'. After successful input of the marker positions, these can be removed again.

2. Operation

The following listing also reproduces, in mirror image, the serialized data processing which has taken place in real time. Three main blocks are to be identified: Data acquisition (Step 1), Tracking (Steps 2-5), and Applications (Step 6).

Step 1: With a sensor working radially in one plane, measurement points are metrically determined and form the raw data. This plane is substantially placed horizontally and furthermore fulfills the conditions defined in "prerequisites." It does not need to be exactly horizontal, and small deviations of up to about 10° are tolerable. Examples of such sensors are LIDAR, which determine distances by the "time of flight" principle. The raw data are continuously determined and are supplied to a computer unit via an interface of the sensor, to be available for further processing.

Step 2: The computer unit determines the static obstacles automatically and continuously by statistical methods, and uses them as reference. By "static obstacles" is meant the whole background, thus e.g. on a street a row of buildings with garden enclosures, trees, but also parked vehicles of any kind. If a measurement point deviates from this reference, it is characterized for further evaluation and thus selected in the sense of a data reduction from the data set of the background.

The background itself can change with time, that is, e.g. a door is opened or a vehicle is parked in the working region of the sensor. These slow changes in comparison with those of the followed objects are processed in the background information and denoted by "adaptation" or "updating" of the background. An updated background and a set of measurement points, termed "object data," form the conclusion of Step 2. Both the updated background and the object data are available in the computer unit for further processing (see FIG. 1).

Step 3: The measurement points characterized for further evaluation, or object measurement points or object data, are allocated to one or more clusters. This results with an allocation of the object measurement points to objects. Clustering takes place by known algorithms, e.g. "smallest geometric distance," "minimal spanning tree," "C-means," etc. (Michael P. Windham, "Cluster Validity for the Fuzzy C-Means Clustering Algorithm," TPAMI, 4(4), 357-363, July 1982). The cluster allocation step acts (a) to consider the data points as abstract objects, and (b) to effect a data reduction. These reduced data sets are further used in Step 4.

Figure 4:
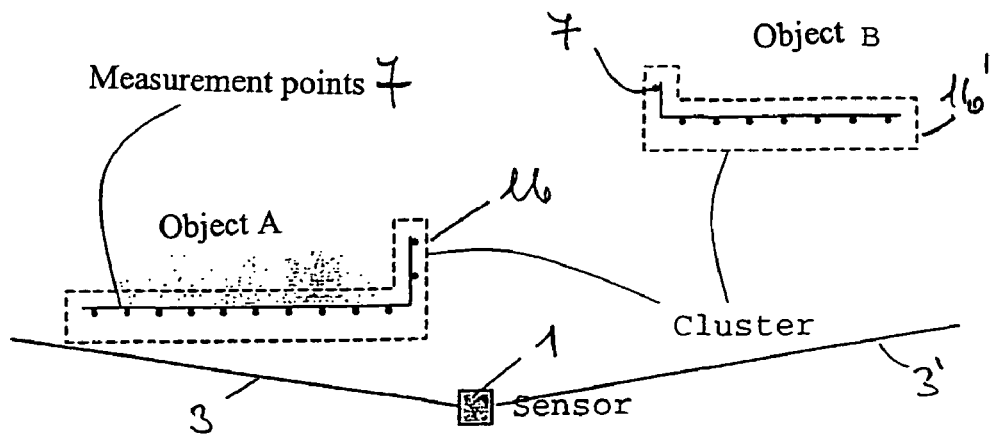
FIG. 4 shows the extraction of objects from the raw data

FIG. 4 shows the extraction of objects from the raw data in a plan view of the device arrangement. Sensor 1 can be seen with the lines 3, 3' which bound the fan-like scenes and are optimally arranged or correlated with these. The object measurement points 7 or object data are allocated to two clusters 16, 16' here, which belong to the objects A and B.

Step 4: The clusters found in the present scene are sought and optimally allocated, or correlated with these. Optimality relates not only to the position of an object, but also to the type and features of all objects, and in fact application-specifically. Examples of algorithms are "Minimal spanning tree," "Feature point tracking," etc. (Yaakov Bar-Shalom, Xiao-Rong Li, Estimation and Tracking Principles: Techniques and Software, Artech House, 1983; Donald B. Reid, An Algorithm for Tracking Multiple Targets, IEEE Transactions on Automatic Control, 24(6), December 1979).

If an object present up to now in the context can no longer be found in the present scene, based on the known, already determined trajectory, it is then speculatively followed up as far as a predetermined uncertainty threshold, i.e., the trajectory is extrapolated. Speculative following takes place using known stochastic methods, e.g. Kalman filtering, "Condensation Filtering," (Mohinder S. Grewal, Angus P. Andrews, Kalman Filtering: Theory and Practice, Prentice-Hall, 1983). A set of objects or object representations with characteristic in the form of a reduced data set forms the conclusion of Step 4.

Figure 5:
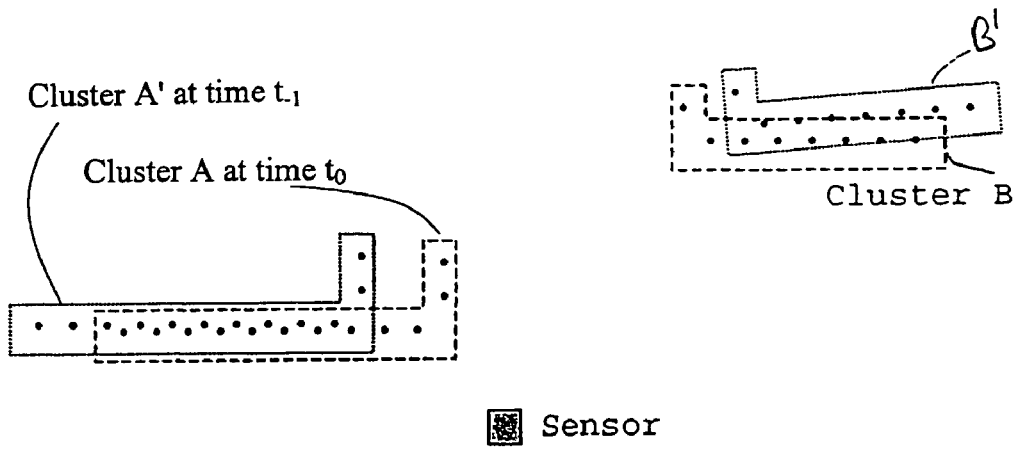
FIG. 5 shows the allocation of obtained objects to known objects

FIG. 5 shows the allocation of proclaimed objects to known objects in a plan view. At time $t_0$ a cluster A was at time $t_0$ while in the past, i.e. at the time $t_1$ the cluster A' can be recognized as cluster A again. The single detectable difference after the allocation is the translational displacement of the object, from which the movement is derived and the trajectory of the object determined. The same holds for the clusters B and B'. With the allocation, cluster B' is recognized as cluster B again, and hence gives the trajectory for the object B.

Step 5: For all objects in context or present in the scene, the corresponding parameters are now updated. For visible objects, additional data such as type, speed and direction are calculated, and also further type-dependent geometric information, such as e.g. length or width of vehicles. For speculatively followed objects which are not visible, only the uncertainty metrics are updated. The objects, or object representations, thus now present are collected in an object database in the computer unit and remain available for a series of uses, or for introspection.

Figure 6:
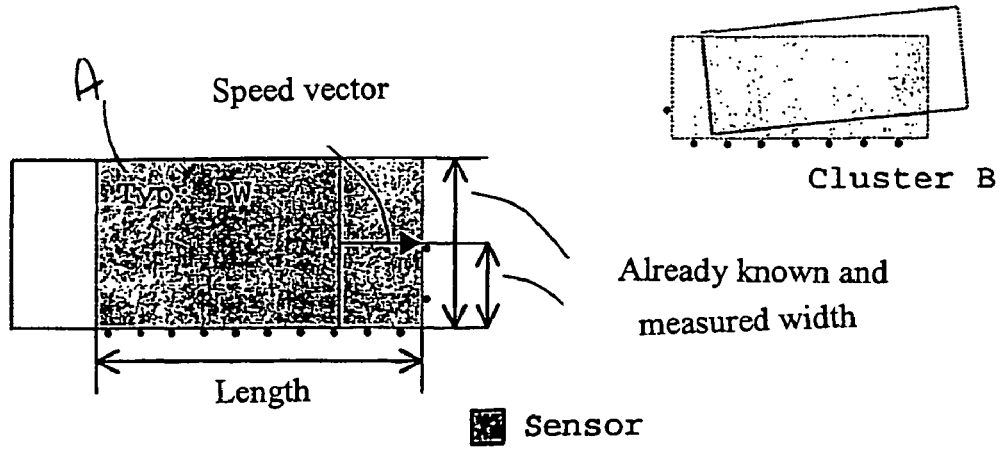
FIG. 6 shows the determination of parameters related to the objects

FIG. 6 shows the determination of parameters related to objects. Furthermore, type PW with length and breadth, as well as a speed vector, can be allocated to the object A. This permits a classification of traffic objects.

Step 6: Possible uses or applications are based on the thus produced object database, which contains the present state of all objects in the scene and also their correlations in the past. Measurement of traffic flow serves as an example. In this case, only a "virtual loop" needs to be defined; a counter becomes active when it is exceeded.

Figure 7:
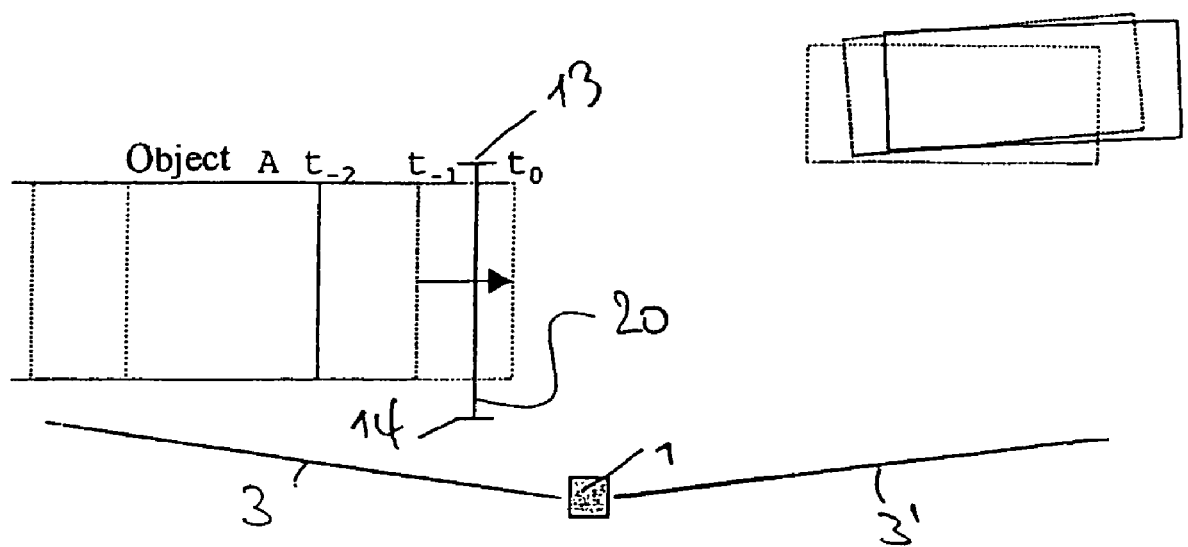
FIG. 7 shows an embodiment example with 'virtual induction loop'.

FIG. 7 shows an embodiment example with "virtual induction loop." The sensor 1 with the bounding lines 3, 3' of its fan-like working region can be seen. An object is shown with its positions at times $t_0$, $t_1$ and $t_2$. A "virtual induction loop" 20, produced with the markers 13, 14, was passed through by the object A between times $t_0$ and $t_1$.

Such a device arrangement is suitable for the realization of monitoring and trigger functions. The traffic flow can be measured in this manner and can be supplemented with the speed, already determined.

3. Data Exchange

The data determined by the various applications (Operation, Step 6) can be made available for further processing, continuously or offline in batch mode. Data which are continuously determined can be used for local traffic control, for example for a flow-controlled traffic signal apparatus, or to trigger a photo or video camera sequence. Data which are transmitted in batch mode can be used, e.g., to perform global traffic planning. Live data can be continuously transmitted by wire or wireless. Detected data provided for the batch mode are secured in a mass memory in the computer and can be exchanged by wire, wireless, or physical transport of the mass memory.

Further Uses

The method is suitable for detecting or identifying numerous traffic violations, namely all those which are not static in nature, but can only be detected by analysis of following the object. The basis for a subsequent punishment of traffic violations can thereby be given. Traffic violations include going through a traffic signal, going over a stop line or a safety line, disregarding pedestrians' precedence at a pedestrian crossing. Furthermore, there is the possibility that disturbances of traffic flow, e.g. collisions, can be detected, and the measures for documentation (photographs) can be activated based on the above data.

A further use is hereinafter described as an example which is not in the traffic sector but is in the field of safety technique. Automatic and optimum guidance is concerned with one or more surveillance cameras, controlled with a guidance system, which uses one or more of the devices mentioned here. "Optimum" in this context means to align the camera nearest to the object, if necessary to use visibility and directions of movement of the object in order to attain the strongest camera setting (angle, zoom).

To attain this, it is only necessary to implement the application mentioned under "Operation," Step 6, above. These data are then supplied to the guidance system by means of a data exchange. The guidance system arranges available cameras toward the objects or rotates their monitored objects (in the order 1:1, 1:n, n:1). This system markedly improves the quality of the video data detection and reduces the operating costs.

In general, with the availability of object representations alone or in cooperation with a guidance system, surveillance systems such as cameras or alarm systems can be controlled. Safety mechanisms such as automatic doors can be controlled alone or in cooperation with a guidance system.

The method can be implemented easily in traffic control with the presence of the abovementioned objects.

The invention claimed is:

1. Method for simultaneously tracking a plurality of objects, wherein a substantially horizontal radially-measuring sensor detects metrical data of moving objects moving freely in a scene within a working region of the sensor, and static objects within the working region of the sensor wherein measurement points of said objects are acquired as raw data, and fed to a computer unit; wherein the raw data are processed in the computer unit such that said moving objects are tracked and their geometrical properties are ascertained, and said static objects are used as references.

2. Method according to claim 1, wherein the static objects are autonomously detected and is adapted or updated when there are changes.

3. Method according to claim 1, wherein when moving objects in the present scene are tracked, present parameters are determined, and past scenes are correlated with the parameters of the moving and static objects.

4. Method according to claim 3, wherein the parameter of the tracked moving object is set to be available for introspection from present and past scenes.

5. Method according to claim 1, wherein moving objects which can no longer be found in a present scene are speculatively tracked further based on the known, already determined trajectory, up to a predetermined uncertainty threshold.

6. Method according to claim 1, wherein a simple and intuitive "in the loop" configuration is made available, the same set of sensors being used for the configuration, or parameterization, and for operation.

7. Method according to claim 1, wherein virtual induction loops are defined, or established, in order to realize monitoring and trigger functions.

8. Method according to claim 1, wherein the traffic flow and/or the speed are measured.

9. Method according to claim 1, wherein traffic objects are classified.

10. Method according to claim 1, wherein all traffic violations which are of a non-static nature, but can only be detected from the analysis of tracking the moving object, are detected and documented.

11. Method according to claim 10, wherein traffic violations include going through traffic signals, going over stop lines and safety lines, and disregarding pedestrians' precedence at pedestrian crossings.

12. Method according to claim 10, wherein disturbances of traffic flow, e.g. collisions, are detected and the measures for documentation (photographs) are activated based on the existing data.

13. Method according to claim 1, wherein surveillance mechanisms are controlled by the available object representations alone or in combination with a guidance system.

14. Method according to claim 13, wherein the surveillance mechanism is at least one of a camera and an alarm system.

15. Method according to claim 1, wherein safety mechanisms are controlled by the available object representations alone or in combination with a guidance system.

16. Method according to claim 15, wherein the safety mechanism is an automatic door.

17. Method according to claim 1, wherein traffic regulation is implemented with the available object representations.

18. Method according to claim 1, wherein the moving objects are followed and their geometrical properties are ascertained to monitor vehicular traffic in the working region of the sensor.

19. Device for performing the method according to claim 1, wherein a substantially horizontal radially-measuring sensor is provided for detecting metrical data of moving objects moving freely in a working region of the sensor, and is connected via an interface to a computer unit, wherein the computer unit is equipped with software, and this software is available for calculating object representations from the raw data of the sensor.

20. Device according to claim 19, wherein the sensor is present, installed such that its sensor plane is at least 25 cm and at most 75 cm from the street.

21. Device according to claim 19, wherein the calculation of the object representations takes place online and offline.

22. Device according to claim 19, wherein it is designed for mobile use.

* * * * *